S. A. CHERRY.
SPRING WHEEL.
APPLICATION FILED MAR. 18, 1915.
1,187,042.
Patented June 13, 1916.
2 SHEETS—SHEET 1.
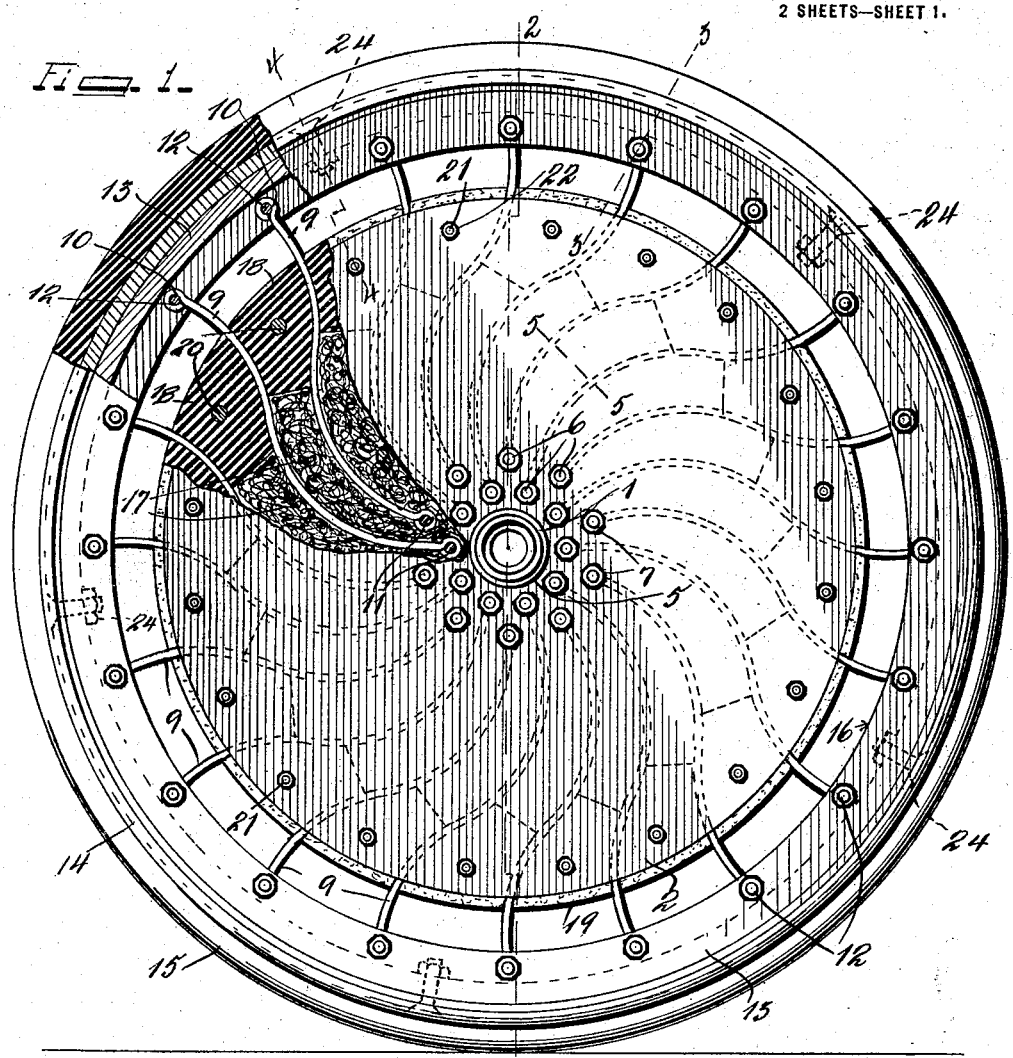
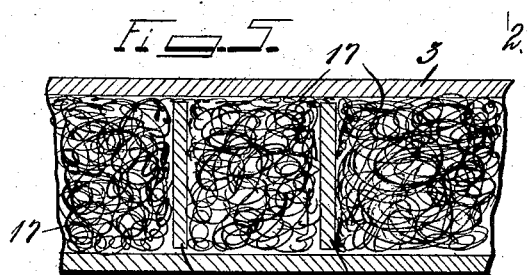
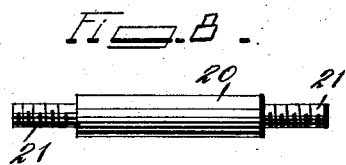

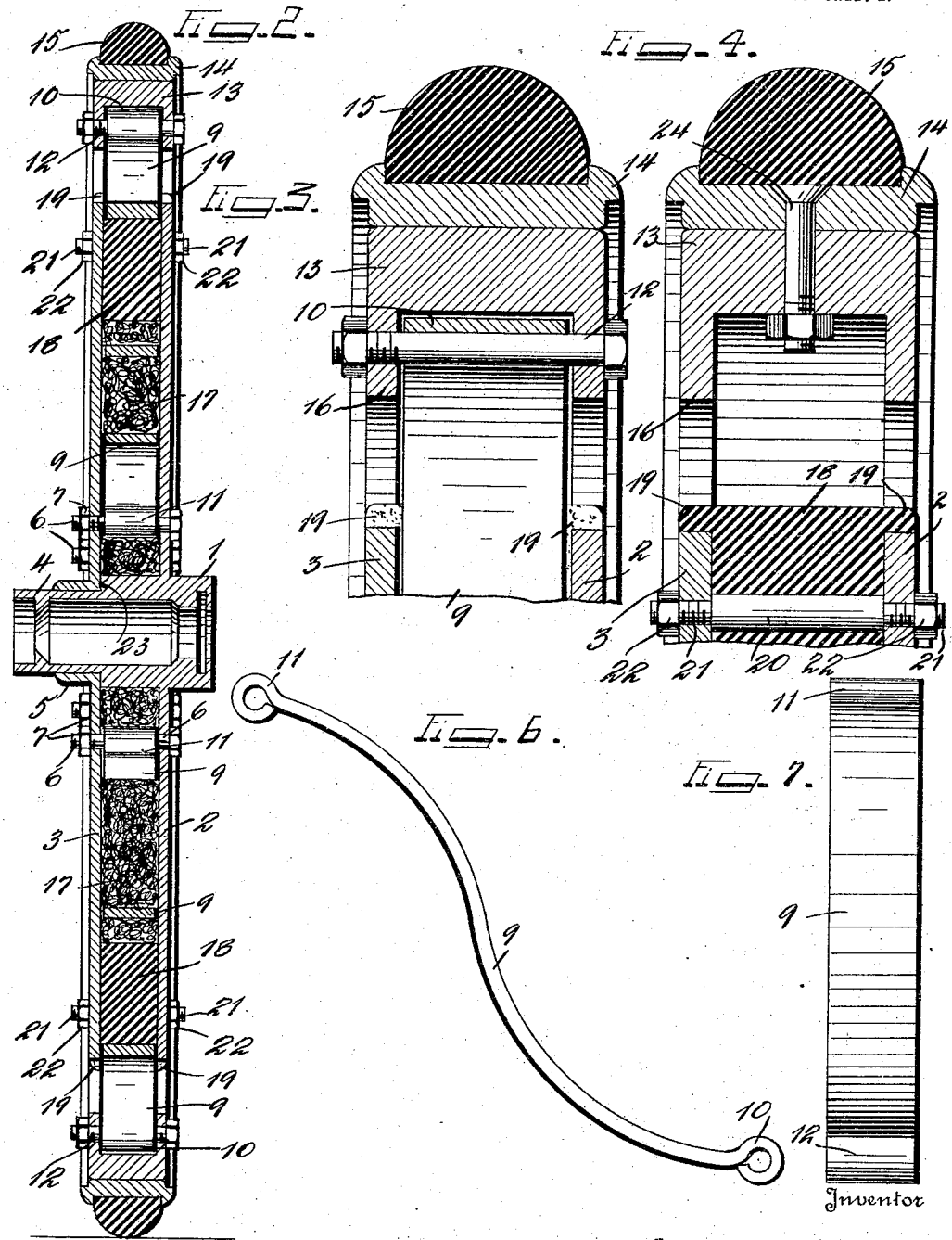

UNITED STATES PATENT OFFICE.

SPENCER A. CHERRY, OF NASHVILLE, TENNESSEE.

SPRING-WHEEL.

1,187,042.   Specification of Letters Patent.   Patented June 13, 1916.

Application filed March 18, 1915. Serial No. 15,354.

*To all whom it may concern:*

Be it known that I, SPENCER A. CHERRY, a citizen of the United States of America, residing at Nashville, in the county of Davidson and State of Tennessee, have invented certain new and useful Improvements in Spring-Wheels, of which the following is a specification, reference being had therein to the accompanying drawing.

This invention relates to spring wheels for automobiles and other vehicles and has for its object the production of a simple and efficient means whereby the supporting springs for the rim of the wheel will be efficiently lubricated so as to prevent the springs from becoming worn or exceedingly heated which would be likely to break the springs or remove the temper therefrom.

Another object of this invention is the production of a simple and efficient wheel which will be resilient without the use of pneumatic tires and which may be readily assembled and any part thereof replaced should the same become injured.

With these and other objects in view this invention consists of certain novel combinations, constructions, and arrangements of parts as will be hereinafter fully described and claimed.

In the accompanying drawings: Figure 1 is a side elevation of the wheel partly shown in section. Fig. 2 is a central vertical section taken on line 2—2, of Fig. 1. Fig. 3 is a section taken on line 3—3, of Fig. 1. Fig. 4 is a section taken on line 4—4, of Fig. 1. Fig. 5 is a section taken on line 5—5, of Fig. 1. Fig. 6 is a side elevation of one of the springs used in connection with the present invention. Fig. 7 is a front elevation of one of the springs used in connection with the present invention. Fig. 8 is a side elevation of one of the spacing bolts used in connection with the device.

By referring to the drawings it will be seen that 1 designates the hub which may be formed of any suitable or desired construction without departing from the spirit of the invention, and this hub carries a side plate 2 which is preferably formed integral therewith. A cover plate 3 is adapted to be fitted upon the outer reduced end 4 of the hub 1 and carries a projecting collar 5 for constituting an efficient means for facilitating the holding of the plate 3 in engagement with the hub 1. The plates 2 and 3 are held in proper spaced relation by means of the spacing bolts 6 clearly illustrated in detail in Figs. 4 and 8 of the drawings. A plurality of these bolts 6 are arranged in staggered relation around the hub 1 of the wheels as clearly illustrated in Fig. 1 of the drawings, and these bolts 6 carry nuts 7 upon their outer threaded ends 8 for firmly holding the bolts in their proper position. The inner ends of the springs 9 which are provided with eyes 10 fit around the bolts 6 and constitute an efficient means for retaining the springs 9 in engagement with the bolts 6 adjacent the hub of the wheel. These springs 9 are substantially S-shaped having a double bow and an eye 11 is formed upon the outer end of each spring, which eye is adapted to be engaged by means of a bolt 12 carried by the rim 13 of the wheel. This rim 13 carries a felly 14 upon which a solid rubber tire 15 is mounted. The felly 14 is provided with a pair of inwardly projecting flanges 16 through which the bolts 12 pass, and it will be seen that the flanges 16 will constitute a protecting means for the eyes 11 of the springs 9. Attention is invited to Figs. 3 and 5 of the drawings for it will be seen that these springs 9 are so positioned between the plates 2 and 3 as to allow a slight space between the edge of the springs 9 and the inner faces of the plates 2 and 3.

A packing of oiled wool or other material 17 is placed between the spokes 9 as clearly illustrated in Figs. 1, 2 and 5 for the purpose of efficiently lubricating the springs at the point where the same would be likely to bear against the inner faces of the plates 2 and 3. It should be understood that sufficient distance is left between the plates 2 and 3 and the edges of the springs 9 to prevent any great amount of friction taking place.

Plugs 18 formed of rubber or other suitable material are placed between the respective spokes 9, and these plugs are provided with overhanging flanges 19 upon the outer side edges thereof for fitting over the respective edges of the plates 2 and 3. It will be seen that these plugs will constitute a very simple and efficient means for preventing the lubricant from being evaporated or leaking out from between the plates 2 and 3. The plugs 18 are firmly held in their proper position by means of the bolts 20 which have their threaded ends 21 passing through the plates 2 and 3 and are retained in their proper position by means of the nuts 22 placed thereon.

In assembling the wheel it should be understood that the spokes 9 are secured to the hub in staggered relation, being fastened at the hub and rim by the respective bolts 6 and 12. The plate 3 is bolted firmly against the shoulder 23 of the hub 1, and it should be understood that the shoulder will give considerable lateral strength and form a housing in which the spokes are free to expand and contract under the variance of temperature which may be likely to affect the different parts of metal out of which the device is formed.

It should be understood that when the weight is applied at the hub, the spokes beneath the hub will be compressed while those opposite the hub are under a tension. Since the spokes are substantially S-shape in construction it will be understood that the hub will be free to change position under variable loads. It should also be understood that the packing wool between the several parts will constitute a very simple and efficient means for keeping the wheel thoroughly lubricated.

It, of course, should be understood that the felly 14 may be held firmly upon the rim 13 by means of the bolts 24 or other suitable fastening means which may be found convenient.

Having thus described the invention what is claimed as new, is:—

1. A wheel of the class described comprising a hub, a plurality of plates carried thereby, a plurality of spring spokes carried by said plates, a fibrous oiled packing positioned between said spokes near the inner ends thereof, a resilient plug fitting between each spoke and provided with overhanging side flanges for fitting over the outer edges of said plates, a felly engaging said spokes, and bolts carried by said plates and passing through said plugs for firmly holding the same against accidental removal from engagement with said plates and sealing the space between the outer edges of said plates and between said spokes.

2. A wheel of the class described comprising a hub, a plurality of spokes carried by said hub, a lubricated packing placed in said hub between said spokes, a resilient plug positioned between said spokes and constituting a retainer for said packing and also a resilient buffer between said spokes, a felly engaging said spokes, and means engaging said spokes for holding the same against accidental removal from said hub.

3. A wheel of the class described comprising a hub, a plurality of plates carried thereby, a plurality of spring spokes carried by said plates, a lubricated packing positioned between said spokes, a resilient plug fitting between each spoke and constituting a yieldable buffer between said spokes, and also constituting a means for holding said lubricated packing between said plates, and means for holding said resilient plugs against displacement from between said plates.

In testimony whereof I hereunto affix my signature in presence of two witnesses.

SPENCER A. CHERRY.

Witnesses:
G. E. LACKEY,
HELEN E. ROYALEY.

Copies of this patent may be obtained for five cents each, by addressing the "Commissioner of Patents, Washington, D. C."